United States Patent
Taylor

(10) Patent No.: US 6,532,117 B2
(45) Date of Patent: Mar. 11, 2003

(54) TABLEWARE MAGNIFIER

(76) Inventor: Ronald Leon Taylor, P.O. Box 980921, Houston, TX (US) 77098

( * ) Notice: Subject to any disclaimer, the term of this patent is extended or adjusted under 35 U.S.C. 154(b) by 0 days.

(21) Appl. No.: 09/751,254

(22) Filed: Dec. 29, 2000

(65) Prior Publication Data

US 2002/0085290 A1 Jul. 4, 2002

(51) Int. Cl.[7] .............................................. G02B 27/02
(52) U.S. Cl. ...................................... 359/803; 359/802
(58) Field of Search ................................. 359/802, 803, 359/804, 806, 818, 822, 812, 811, 798; 73/862, 632, 637, 323, 327; 120/119

(56) References Cited

U.S. PATENT DOCUMENTS

| | | | |
|---|---|---|---|
| 3,397,935 A | * 8/1968 | Natsume | 215/316 |
| 4,457,585 A | 7/1984 | DuCorday | 350/235 |
| 4,819,351 A | 4/1989 | Boitani | 40/642 |
| D314,009 S | 1/1991 | Boitani | D19/26 |
| 5,101,300 A | * 3/1992 | Hicks | 359/802 |
| 5,245,477 A | 9/1993 | Nyman | 359/818 |
| 5,333,907 A | 8/1994 | Schaeffer | 281/42 |
| 5,471,347 A | 11/1995 | Galiani | 359/807 |
| 5,608,203 A | 3/1997 | Finkelstein et al. | 235/487 |
| 5,610,770 A | 3/1997 | Galiani | 359/807 |
| 5,760,975 A | * 6/1998 | DiGiovanni | 359/802 |
| 5,772,065 A | * 6/1998 | Kalamaras | 220/612 |
| 5,818,634 A | * 10/1998 | Richard et al. | 359/565 |
| 5,999,336 A | 12/1999 | Yang, Jr. | 359/742 |
| 6,050,414 A | * 4/2000 | Saffron et al. | 206/457 |
| 6,152,575 A | 11/2000 | Montamino | 362/251 |

* cited by examiner

*Primary Examiner*—Hung Xuan Dang
*Assistant Examiner*—Tuyen Tra
(74) *Attorney, Agent, or Firm*—Guy McClung

(57) ABSTRACT

A tableware item having a body, and a magnifier on the body. A method for using such a tableware item to read printed material such as, but not limited to, a menu or wine list.

17 Claims, 4 Drawing Sheets

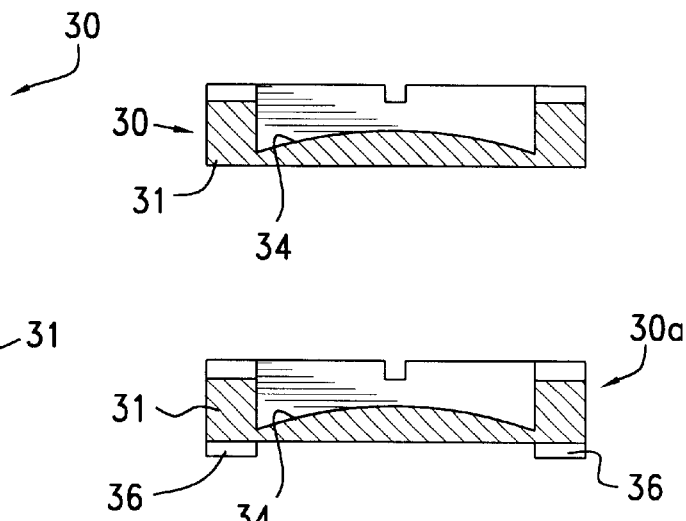
FIG.3B
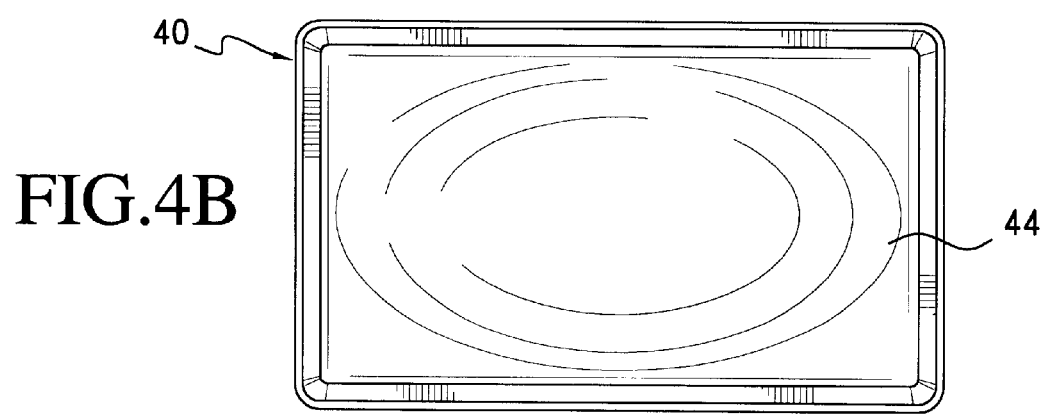
FIG.3A  FIG.3C
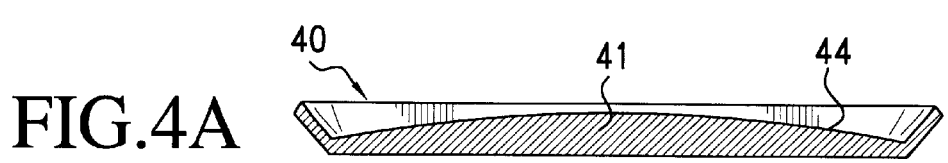
FIG.4B
FIG.4A

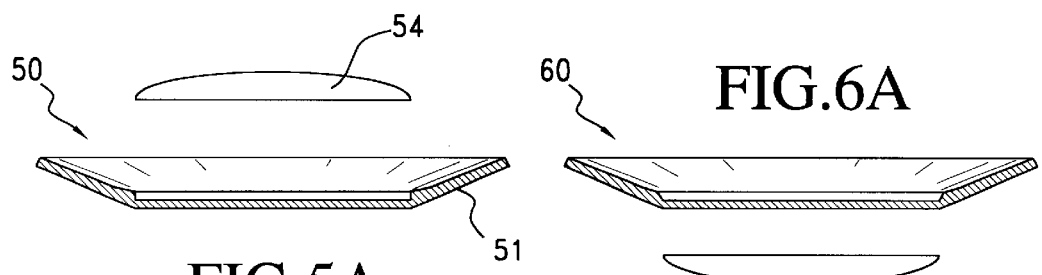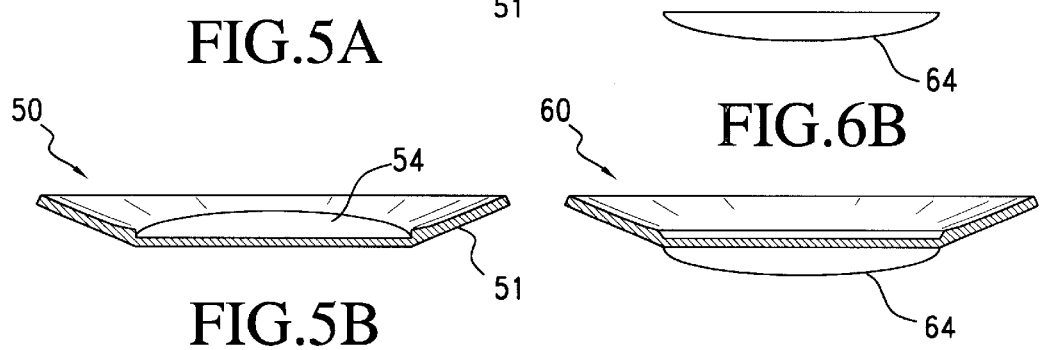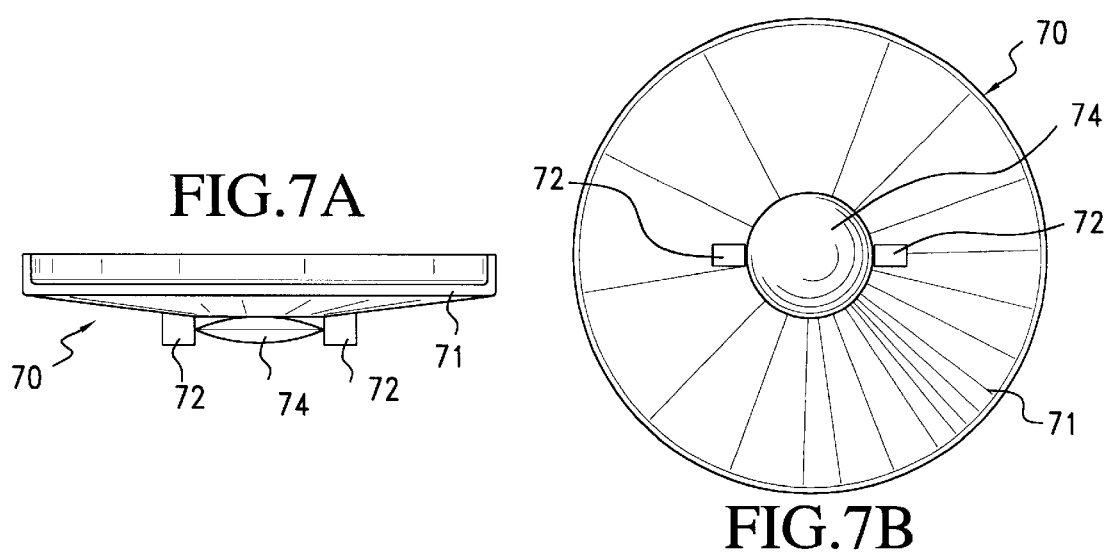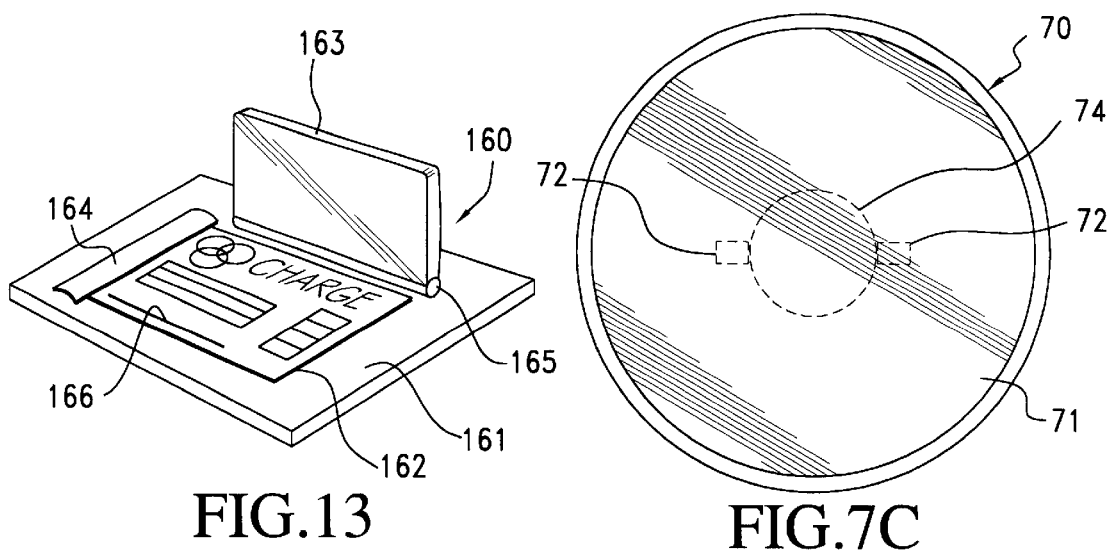

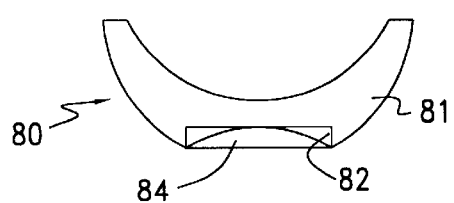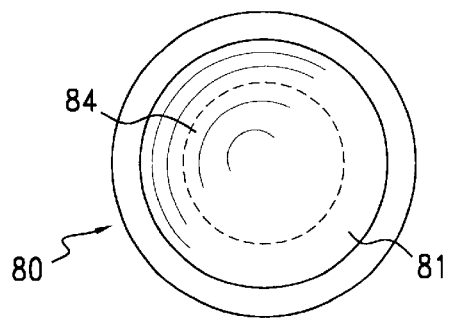
FIG.8A  FIG.8B
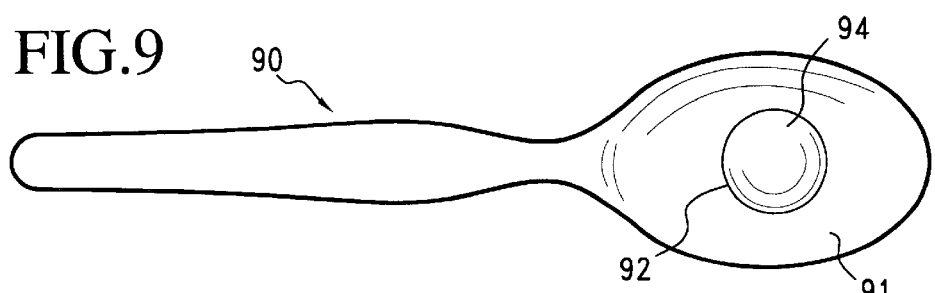
FIG.9
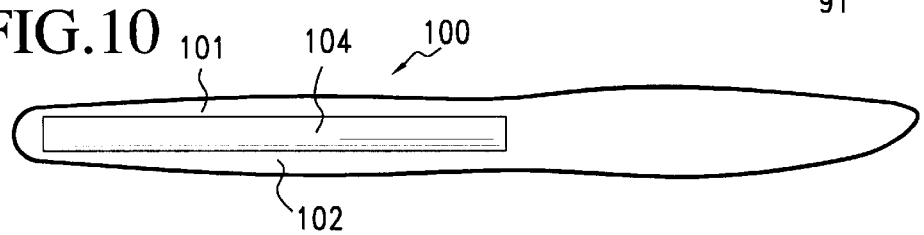
FIG.10
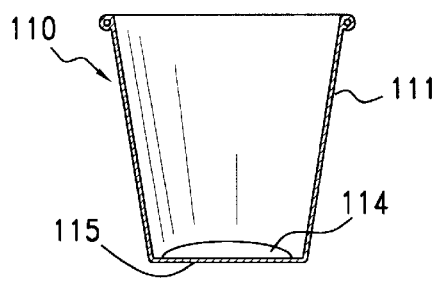
FIG.11A
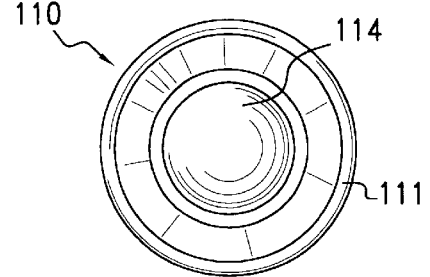
FIG.11B
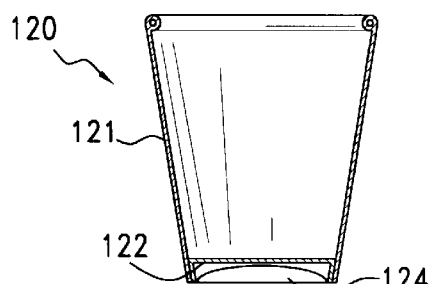
FIG.12A
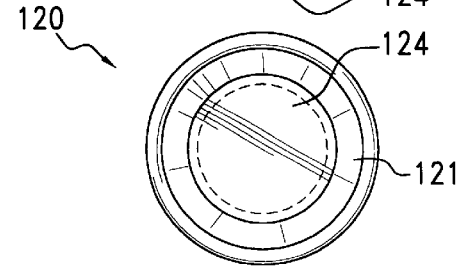
FIG.12B

TABLEWARE MAGNIFIER

BACKGROUND OF THE INVENTION

1. Field of the Invention

This invention is directed to magnifying devices, particularly to tableware incorporating a magnifier therein, and to methods for using such a device to read a menu, wine list, dessert list or other material at a table, e.g., but not limited to, in a restaurant.

2. Description of Related Art

Most restaurants use printed lists or menus of food and drinks available to customers. Some of these lists or menus of food and drink are sometimes displayed in large bold print and are relatively easy to read by all patrons. However, in some eating establishments, their lists or menus are printed in relatively small type. Also the lighting in such places may be insufficient so that some people cannot read the printed materials or read them with difficulty. In many restaurants the lighting is dimmed or candle light is used to impart a desirable atmosphere for the enjoyment of the patrons. This presents a problem even for many patrons having normal vision.

Restaurant patrons can be provided with a prior art magnifying device, such as a conventional lens, a Fresnel lens or other flat sheet type lens for the purpose of magnifying the print of the menus. But it is relatively easy for such a lens to become separated from the menu so that it is not readily available for use by the customer. In some cases, magnifying lenses which are provided for use by customers become lost or are taken by customers because of their desirability for other purposes. In other prior art systems a restaurant menu or booklet magnification system has a lens, e.g. a flat sheet type lens that is physically attached to the structure of the menu or booklet itself and can be moved to an appropriate position by the patron or other user for accomplishing desired magnification of the print.

Certain prior art lens magnification systems for pamphlets or booklets such as restaurant menus enable a lens, such as a flat sheet lens, to be permanently attached to the menu structure and permit a customer to turn the pages of the booklet or menu so that the customer can use the lens for magnifying the print on all pages of a menu.

There has long been a need for an efficient, effective, and aesthetically pleasing tableware magnifier for use in reading printed items, e.g. in a restaurant. There has long been a need, recognized by the present inventor, for such a tableware magnifier which can be used conveniently and is easy to use. There has long been a need for such a tableware item that can be used without embarrassment.

SUMMARY OF THE PRESENT INVENTION

The present invention, in certain aspects, discloses an item of tableware that includes a magnifier. In particular aspects, the item of tableware is a plate, a saucer, a coaster, a tray, an ashtray, a bowl, a spoon, a fork, a knife, a cup, a glass or a dish. The magnifier is a magnifying lens connected to or secured in the item of tableware.

In one particular aspect, the item of tableware is a plate such as a salad plate, bread plate, bread dish, butter dish, butter plate or a dinner plate which has a magnifying lens in its center. Optionally, the lens may be clear or tinted a desired color and/or the plate may be clear (e.g. glass or crystal) or opaque, with or without ornamentation, design(s), and/or an identifying logo, trademark, or other indicia. In certain aspects the lens is formed integrally of the plate. In other aspects the lens is permanently secured in an opening through the plate or it is releasably secured in such an opening. The lens itself may have indicia, etc. therein and/or thereon.

In certain other particular aspects one or more secondary members are releasably attached to the plate (or other tableware item). Such a secondary member may be clear, tinted, or bear indicia, etc. It may be attached adjacent the lens; around the item's periphery; to the item's underside; and/or on top of the item. Optionally, a light may be provided with the item of tableware which may be any known light source or apparatus for use in conjunction with a lens, a magnifier, or item of tableware.

In certain aspects an item of tableware according to the present invention has a main body, e.g. but not limited to a typical known plate, dish, saucer, tray, or coaster, with a clear transparent portion to which is attached a magnifier, either on a top surface or on a bottom surface so that the magnifier can be used to view printed material. In other aspects a tableware item has an opening in which a magnifier is held by a friction fit and/or within one or more grooves and/or notches, either permanently or releasably.

In certain methods according to the present invention a restaurant patron able to read a menu by scanning the menu with a plate, etc., that is simple, easy to use, and requires no training or instruction. In certain aspects an item according to the present invention blends in with the rest of the dinner items placed on a table and is inconspicuous, therefore allowing the user to not be embarrassed, restrained, or shy in using the article to read the menu and such an item solves a problem currently affecting individuals whose vision has degraded, affecting their ability to clearly read menus, etc., in restaurants where lighting, print, fonts/styles, and color or a combination of factors prevent a clear view of the menu, etc.

Certain items according to the present invention have two functions: 1) providing an inconspicuous magnification item to read a menu, etc., clearly; and 2) providing a tableware item to hold food, drink, etc. For establishments such as restaurants, items according to the present invention provide a means by which patrons, with vision problems, can view a menu, etc. without embarrassment and order properly and comfortably. A restaurant need not have to provide a separate magnifier either on a table or at another location for this purpose. An item according to the present invention blends in with a table setting, and can be handled by restaurant personnel as a utensil and does not have to have specific handling, storage, or cleaning requirements which would add cost to the operation of the restaurant. A tableware magnifier according to the present invention, because of its size and shape, cannot easily be taken by patrons after the meal for their own personal use, thus no replacement items added cost associated therewith are required.

In certain aspects use of an item according to the present invention avoids the printing of larger print menus, etc., e.g. by the restaurants, by magnifying the menu etc., thus saving the expenditures of money by avoiding the purchase of new large print printed material for their customers with visual acuity problems.

What follows are some of, but not all, the objects of this invention. In addition to the specific objects stated below for at least certain preferred embodiments of the invention, other objects and purposes will be readily apparent to one of skill in this art who has the benefit of this invention's teachings and disclosures. It is, therefore, an object of at least certain preferred embodiments of the present invention to provide:

New, useful, unique, efficient, non-obvious tableware items with a magnifier and methods of their use;

Such a tableware item with a light;

Such a tableware item with a magnifying lens either permanently or releasably secured thereto, or formed integrally thereof;

Such a tableware item which is also a useful utensil;

Such tableware item which bears indicia, including, but not limited to, a logo, or trademark, and/or design;

Such a tableware item which can be used by a restaurant patron without embarrassment;

Such a tableware item designed as a give-away item which a patron may take or as an item which would be difficult to take; and Such a tableware item to which a secondary member is releasably attached.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 3A is a top view of an ashtray according to the present invention. FIG. 3B is a side cross-section view of the ashtray of FIG. 3A. FIG. 3C is a side cross-section view of an ashtray according to the present invention.

FIG. 4A is side cross-section view of the tray according to the present invention. FIG. 4B is a top view of a tray of FIG. 4A.

FIG. 5A is an exploded side cross-section view of a plate according to the present invention. FIG. 5B is a side cross-section view of the plate of FIG. 5A.

FIG. 6A is an exploded side cross-section view of a plate according to the present invention. FIG. 6B is a side cross-section view of the plate of FIG. 6A.

FIG. 7A is a side view of a dish according to the present invention. FIG. 7B is a bottom view of the dish of FIG. 7A. FIG. 7C is a top view of the dish of FIG. 7A.

FIG. 8A is a side cross-section view of a bowl according to the present invention. FIG. 8B is a top view of the bowl of FIG. 8A.

FIG. 9 is a top view of a spoon according to the present invention.

FIG. 10 is a side view of a knife according to the present invention.

FIG. 11A is a side cross-section view of a cup according to the present invention. FIG. 11B is a top view of the cup of FIG. 11A.

FIG. 12A is a side cross-section view of a beverage container according to the present invention. FIG. 12B is a top view of the beverage container of FIG. 12A.

FIG. 13 is a perspective view of an apparatus according to the present invention.

DESCRIPTION OF EMBODIMENTS PREFERRED AT THE TIME OF FILING FOR THIS PATENT

Figures 1A, 1B:
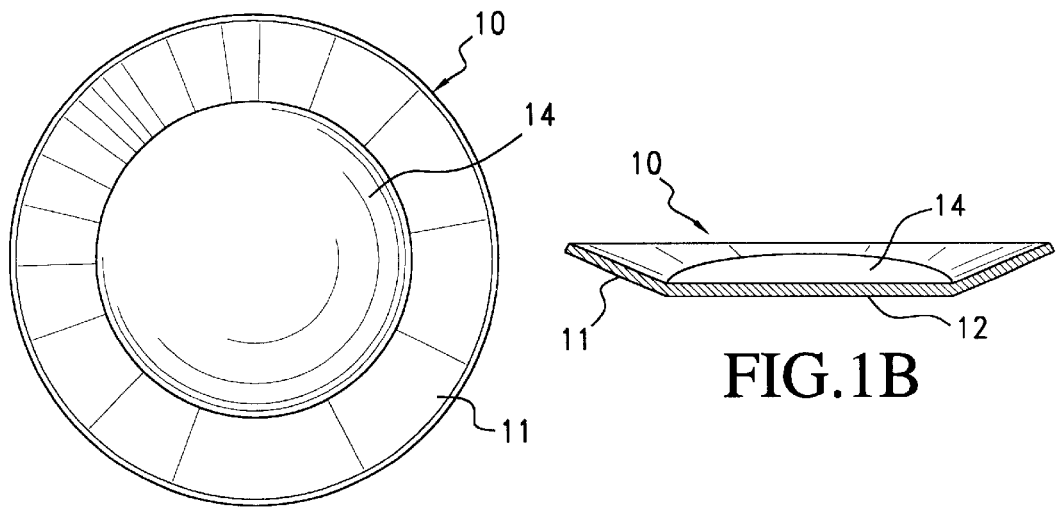
FIG. 1A is a top view of a plate according to the present invention.
FIG. 1B is a side cross-section view of the plate of FIG. 1A.

FIGS. 1a and 1B show a plate 10 according to the present invention which has a body 11 with a lower flat portion 12 which is clear and transparent. A lens magnifier 14 is formed integrally of the body 10 and has a lower surface adjacent the clear portion 12 of the body 10. Although the plate 10 is shown as generally circular, it is within the scope of this invention for the plate (and any tableware item herein) to have any suitable shape, including, but not limited to square, rectangular, round, oval and polygonal. The lens magnifier 14 may be a lens of any desired width and of any desired magnification strength.

Figures 2A, 2B, 2C:
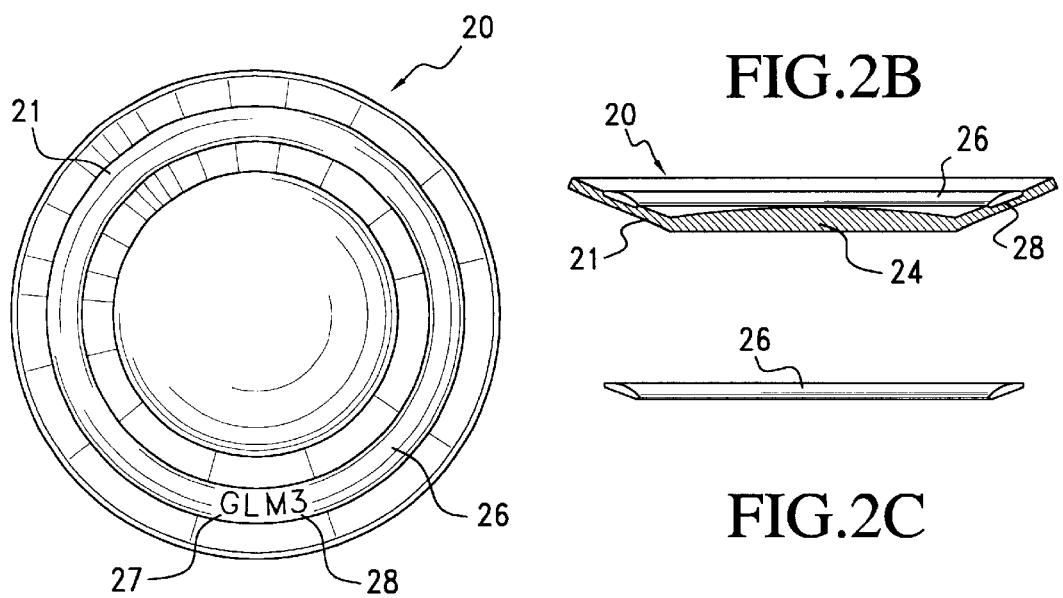
FIG. 2A is a top view of a plate according to the present invention.
FIG. 2B is a side cross-section view of the plate of FIG. 2A.
FIG. 2C is a side cross-section view of part of the plate of FIG. 2A.

FIGS. 2A and 2B show a plate 20 according to the present invention with a body 21 and a clear magnifying lens 24 formed integrally of the body 21. A secondary member 26 (see FIG. 2C) is secured in a groove 28 that extends around the plate 20. The secondary member 26 may be attached, secured, or connected in any suitable manner; it may be glued into the groove 28; or it may be installed with a friction fit for easy removal and replacement. Optionally, two, three or more such secondary members may be used on a single plate. Also, a secondary member according to the present invention may extend for only a portion of the plates entire circumference.

As shown in FIG. 2A, the secondary member 26 has indicia 27 thereon—"GLM3." It is within the scope of this invention for the secondary member to bear any desirable logo(s), design(s) slogan(s), marking(s), words(s), and/or trademark(s) (herein referred to collectively as "indicia"). Optionally, any lens or magnifier herein may also have any desired indicia therein or thereon. Optionally, a secondary member according to the present invention may be of a desired color, partially or entire. It is also within the scope of this invention for the secondary member to have any desired cross-sectional shape. The groove 28 may be deleted and the secondary member attached, secured, glued, or connected to the plate with any known connector, adhesive, structure and/or with a pin/hole arrangement with one or more pins on the secondary member that are received in one or more corresponding holes, or vice versa with the pin(s) on the plate and the hole(s) in the secondary member.

FIGS. 3A and 3B show an ashtray 30 according to the present invention which has a body 31 with a clear lens magnifier 34 formed integrally of the body 31. Optionally, a separate piece magnifier may be installed in the ashtray. As shown in FIG. 3C an ashtray 30a, like the ashtray 30, has a light apparatus 36 (shown schematically) to aid a person using the lens magnifier 34. Any known light source or light apparatus may be used and may be located appropriately on the ashtray. Any tableware item disclosed herein may also have such a light apparatus. The light apparatus may be, in certain preferred embodiments, like those in U.S. Pat. Nos. 6,152,575; 5,575,553; and in any prior art patents or patent documents mentioned or cited in either of these patents—all of said patents and prior art incorporated herein fully for all purposes; and any magnifier as disclosed herein may be used in any tableware item in any of these patents or prior art.

FIGS. 4A and 4B show a tray 40 according to the present invention with a body 41 and a clear lens magnifier 44 formed integrally of the body 41.

FIGS. 5A and 5B show a dish 50 with a body 51 and a lens magnifier 54 attached (see FIGS. 5B) to the body 51. The part of the body 51 beneath the lens magnifier 54 is clear and transparent.

FIGS. 6A and 6B show a dish 60 according to the present invention with a body 61 and a lens magnifier 64 attached (see FIG. 6B) to the body 61. The part of the dish adjacent the lens magnifier 64 is clear and transparent.

FIGS. 7A–7C show a plate 70 according to the present invention which has a body 71 with downwardly projecting members 72 which hold a lens magnifier 74, by a friction fit and/or with a glue or adhesive. Three, four or more members like the members 72 may be used (and such a lens mounting structure may be used on any tableware item according to the present invention).

FIGS. 8A and 8B show a bowl 80 according to the present invention with a recess 82 in a body 81. A clear lens magnifier 84 is positioned in the recess 82 and is held in place by a friction fit and/or glue or adhesive.

FIG. 9 shows a spoon 90 according to the present invention with a clear magnifying lens 94 secured in an opening 92 through the spoon body 91.

FIG. 10 shows a knife 100 according to the present invention with a body 101 and a magnifier 104 in an opening 102 through the body 101. Any item of flatware may, according to the present invention, have a lens magnifier therein, e.g. as those of the spoon 90 or knife 100. Any lens magnifier in any item herein may be of an appropriate shape other than circular as viewed from above, including, but not limited to, a shape as that of the magnifier 104.

FIGS. 11A and 11B show a beverage container (cup, glass, mug) 110 according to the present invention with a body 111 and a clear lens magnifier 114 over a clear bottom portion 115 of the body 111.

FIGS. 12A and 12B show a beverage container (cup, glass, mug) 120 with a body 121 and a recess 122 formed at the bottom of the container. A clear lens magnifier 124 is held within the recess 122 by a friction fit and/or glue or adhesive. A clear portion 125 of the body 121 is adjacent the lens magnifier 124.

FIG. 13 shows a document viewing apparatus 160 according to the present invention which has a base 161 on which a document 162 is positioned. A magnifier 163 is movably connected to the base 161 e.g. with a hinge 165 so that, following placement of the document 162 on the base 161, the magnifier 163 is movable to a position above the document 162 to facilitate viewing of the document 162 with the magnifier 163. Optionally a clip 164 may be used to releasably hold the document 162 in place on the base 161.

The document 162 may be a typical credit card payment slip with payment information and totals thereon and a signature line 166. The magnifier 163 may be positioned so that when it is moved over the document it does not cover the signature line 166. The magnifier 163 may be any magnifier disclosed herein.

The present invention, therefore, provides in certain, but not necessarily all embodiments, a tableware item with a body, and a magnifier on the body. Such a tableware item may have one, some (in any possible combination) or all of the following: wherein the body is a plate, e.g. but not limited to a bread plate or butter plate; wherein the plate has a central opening and the magnifier is a magnifying lens at the central opening; wherein the magnifying lens is secured in the central opening; wherein the magnifying lens is releasably secured in the central opening; wherein the plate has a color and the magnifying lens is tinted with a color; wherein the plate's color is different from the color of the magnifying lens; wherein the magnifier is formed integrally of the body and/or has a square, round, oval or rectangular shape as viewed from above; and wherein the plate is clear; the plate having a clear portion adjacent the magnifying lens through which the magnifying lens is viewable; the body having a clear portion adjacent the magnifier through which the magnifier is viewable; a secondary member attached to the body; wherein the secondary member bears indicia; wherein the secondary member is releasably attached to the plate; wherein the secondary member extends around a circumference of the tableware item; wherein the tableware item is from the group consisting of plate, flatware, coaster, tray, bowl, and dish; wherein the magnifier is formed integrally of the body; wherein the magnifier is connected to the body; and/or wherein the magnifier is adhered to the body.

The present invention, therefore, provides in certain, but not necessarily all embodiments, a method for reading printed material, the method including viewing the printed material with a magnifier of a tableware item, the tableware item with a body, and a magnifier on the body, the magnifier including any described or claimed herein and the tableware item being any described or claimed herein.

The present invention, therefore, provides in certain, but not necessarily all embodiments, an apparatus for viewing a document, the apparatus with a support for supporting the document, and a magnifier movably connected to the support for selective positioning over at least part of the document. Such a tableware item may have one, some (in any possible combination) or all of the following: wherein the document is a credit card payment form; wherein the magnifier is hingedly connected to the support; wherein the magnifier is positioned to cover the payment information and does not cover a signature line portion of the credit card payment form; and/or a clip for releasably holding the document on the support.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. This specification and the claims that follow are in accordance with all of the requirements of 35 U.S.C. §112. The inventors may rely on the Doctrine of Equivalents to determine and assess the scope of their invention and of the claims that follow as they may pertain to apparatus not materially departing from, but outside of, the literal scope of the invention as set forth in the following claims.

What is claimed is:

1. A tableware plate comprising
   a tableware plate body with a first side spaced apart from a second side, said first side and said second side positioned for use in a generally horizontal position, and
   a magnifier on the tableware plate body, the magnifier with a first side spaced apart from a second side for physical visual viewing of a magnified image of an object on the first side by a person on the second side, the object outside the first side of the tableware plate body and outside the tableware plate body.

2. The tableware plate of claim 1 wherein the tableware plate body has a central opening and the magnifier is a magnifying lens at the central opening.

3. The tableware plate of claim 2 wherein the magnifying lens is secured in the central opening.

4. The tableware plate of claim 3 wherein the magnifying lens is releasably secured in the central opening.

5. The tableware plate of claim 2 wherein the tableware plate body has a color and the magnifying lens is tinted with a color.

6. The tableware plate of claim 5 wherein the tableware plate body's color is different from the color of the magnifying lens.

7. The tableware plate of claim 2 further comprising the tableware plate body having a clear portion adjacent the magnifying lens through which the magnifying lens is viewable.

8. The tableware plate of claim 1 wherein the magnifier is formed integrally of the tableware plate body.

9. The tableware plate of claim 1 wherein the tableware plate body is clear.

10. The tableware plate of claim 1 further comprising
    the tableware plate body having a clear see-through portion adjacent the magnifier through which the magnifier and the object are physically visually viewable.

11. The tableware plate of claim 1 further comprising
    a secondary member attached to the tableware plate body.

12. The tableware plate of claim 11 wherein the secondary member bears indicia.

13. The tableware plate of claim 11 wherein the secondary member is releasably attached to the plate.

14. The tableware plate of claim 11 wherein the secondary member extends around a circumference of the tableware plate.

15. The tableware plate of claim 1 wherein the magnifier is connected to tableware plate body.

16. The tableware plate of claim 1 wherein the magnifier is adhered to the tableware plate body.

17. A method for reading printed material, the method comprising
    viewing the printed material with a magnifier of a tableware plate, the tableware plate comprising a tableware plate body with a first side spaced apart from a second side, said first side and said second side positioned for use in a generally horizontal position, and
    a magnifier on the tableware plate body, the magnifier with a first side spaced apart from a second side for physical visual viewing of a magnified image of the printed material on the first side by a person on the second side, the printed material outside the first side of the tableware plate body and outside the tableware plate body.

* * * * *